(12) United States Patent
Chau

(10) Patent No.: US 12,058,287 B2
(45) Date of Patent: Aug. 6, 2024

(54) RECONNECTING A CALLING DEVICE TO A STAGE OF AN INTERACTIVE VOICE RESPONSE SERVICE

(71) Applicant: Zoom Video Communications, Inc., San Jose, CA (US)

(72) Inventor: Vi Dinh Chau, Seattle, WA (US)

(73) Assignee: Zoom Video Communications, Inc., San Jose, CA (US)

( * ) Notice: Subject to any disclaimer, the term of this patent is extended or adjusted under 35 U.S.C. 154(b) by 55 days.

(21) Appl. No.: 17/832,067

(22) Filed: Jun. 3, 2022

(65) Prior Publication Data

US 2023/0035845 A1 Feb. 2, 2023

Related U.S. Application Data

(63) Continuation of application No. 17/390,657, filed on Jul. 30, 2021, now Pat. No. 11,356,555.

(51) Int. Cl.
*H04M 3/02* (2006.01)
*H04M 3/493* (2006.01)
*H04M 3/51* (2006.01)

(52) U.S. Cl.
CPC .......... *H04M 3/5166* (2013.01); *H04M 3/02* (2013.01); *H04M 3/4936* (2013.01)

(58) Field of Classification Search
CPC ..... G10L 15/22; G10L 25/48; H04L 63/0421; H04L 65/403; H04L 65/1083; H04L 67/306; H04L 12/2814; H04L 43/50; H04L 45/28; H04L 63/0428; H04L 65/1096; H04L 67/55; H04L 69/40; H04M 3/02; H04M 3/487; H04M 3/493; H04M 3/4936; H04M 3/4938; H04M 3/5156; H04M 3/5166; H04M 2203/2088; H04M 3/523; H04M 3/53333; H04M 3/28; H04M 3/385; H04M 3/42374; H04M 3/436; H04M 3/5183; H04M 3/5233; H04M 3/5237;
(Continued)

(56) References Cited

U.S. PATENT DOCUMENTS 5,867,562 A * 2/1999 Scherer ................ H04M 3/436
379/114.15
6,445,918 B1 9/2002 Hellander
(Continued)

*Primary Examiner* — Gerald Gauthier
(74) *Attorney, Agent, or Firm* — Young Basile Hanlon & MacFarlane, P.C.

(57) ABSTRACT

Message-based interactive voice response (IVR) menu reconnection is used to reconnect a calling device to a destination at a specific node of a call path after the calling device disconnects from a call with the destination. Menu options of an IVR service presented during a call between the calling device and the destination are determined responsive to the calling device disconnecting from the call. A message including one or more selectable elements each associated with one of the menu options is then transmitted to the calling device. Responsive to a selection of a selectable element at the calling device, the calling device is connected to a destination endpoint. Thus, where the calling device had partially or fully traversed an IVR service during the call, the message-based IVR menu reconnection disclosed herein enables the calling device to reconnect to the destination without having to repeat that IVR service traversal.

17 Claims, 9 Drawing Sheets

(58) Field of Classification Search
CPC ........ H04M 3/5307; H04M 3/56; H04M 3/58; H04M 7/1295; H04M 15/55; H04W 76/19; G06F 3/04817; G06F 9/5072; G06Q 10/10; G06Q 20/36; G06Q 20/40; G06Q 30/0016; G06Q 30/0267; H04N 1/00477; H04Q 3/64
USPC .............. 348/14.11; 379/67.1, 88.01, 88.04, 379/88.16; 455/423
See application file for complete search history.

(56) References Cited

U.S. PATENT DOCUMENTS

| | | | | |
|---|---|---|---|---|
| 6,459,776 | B1* | 10/2002 | Aktas | H04M 3/5307 379/88.19 |
| 6,633,760 | B1 | 10/2003 | Ham et al. | |
| 6,975,708 | B1* | 12/2005 | Scherer | H04M 3/436 379/127.01 |
| 7,228,145 | B2 | 6/2007 | Burritt et al. | |
| 7,539,127 | B1* | 5/2009 | Shaffer | H04L 69/40 370/216 |
| 8,139,729 | B2 | 3/2012 | Phelps | H04M 7/1295 379/156 |
| 8,369,496 | B2 | 2/2013 | Deshpande et al. | |
| 8,798,036 | B2 | 8/2014 | K t et al. | |
| 8,804,944 | B1* | 8/2014 | Hopkins | H04M 3/523 379/265.09 |
| 8,842,812 | B2* | 9/2014 | Sarkar | H04M 3/5166 379/265.01 |
| 9,072,016 | B1 | 6/2015 | Abou-El-Ella | |
| 9,491,768 | B1* | 11/2016 | Moore | G06Q 20/36 |
| 10,679,248 | B1* | 6/2020 | Demsey | H04M 3/4936 |
| 10,958,540 | B1* | 3/2021 | Lilley | H04L 67/306 |
| 10,979,568 | B1* | 4/2021 | Lu | G06F 3/04817 |
| 11,356,555 | B1* | 6/2022 | Chau | H04M 3/02 |
| 2001/0040887 | A1* | 11/2001 | Shtivelman | H04M 3/5237 370/352 |
| 2004/0013255 | A1* | 1/2004 | Williams | H04Q 3/64 379/207.02 |
| 2006/0029190 | A1* | 2/2006 | Schultz | H04M 3/385 379/88.01 |
| 2006/0093100 | A1* | 5/2006 | Carlson | H04M 3/4938 379/88.16 |
| 2006/0126803 | A1* | 6/2006 | Patel | H04M 3/5166 379/88.01 |
| 2006/0126804 | A1* | 6/2006 | Lee | H04M 3/53333 379/88.01 |
| 2006/0188075 | A1* | 8/2006 | Peterson | H04M 3/5191 379/67.1 |
| 2006/0203975 | A1* | 9/2006 | Erhart | H04M 3/4938 379/88.01 |
| 2006/0233326 | A1* | 10/2006 | Erhart | H04M 3/5166 379/88.16 |
| 2007/0041554 | A1* | 2/2007 | Newman | H04L 43/50 379/1.01 |
| 2007/0133521 | A1* | 6/2007 | McMaster | H04M 15/55 370/352 |
| 2007/0135082 | A1* | 6/2007 | Erhart | H04M 3/4938 455/343.5 |
| 2007/0140465 | A1* | 6/2007 | Erhart | H04M 3/493 379/235 |
| 2007/0263644 | A1 | 11/2007 | Christie et al. | |
| 2007/0275711 | A1* | 11/2007 | Buti | H04W 76/19 455/423 |
| 2008/0039056 | A1 | 2/2008 | Mathews et al. | |
| 2008/0056464 | A1* | 3/2008 | Kalahasti | H04L 63/0428 379/88.18 |
| 2008/0059605 | A1* | 3/2008 | Shalev | H04L 12/2814 709/217 |
| 2008/0080693 | A1* | 4/2008 | Mori | H04M 3/523 379/215.01 |
| 2008/0162459 | A1* | 7/2008 | Portnoy | G06Q 10/10 707/999.005 |
| 2008/0184106 | A1* | 7/2008 | Tischer | H04M 3/493 715/241 |
| 2008/0268823 | A1* | 10/2008 | Shalev | H04L 67/55 455/414.1 |
| 2009/0027484 | A1* | 1/2009 | Erhart | H04M 3/5166 348/14.11 |
| 2009/0041210 | A1* | 2/2009 | Jaiswal | H04M 3/56 379/202.01 |
| 2009/0141872 | A1* | 6/2009 | Li | H04M 3/493 379/88.04 |
| 2009/0202056 | A1* | 8/2009 | Raghav | H04M 3/58 379/142.04 |
| 2010/0063935 | A1* | 3/2010 | Thomas | G06Q 20/40 705/325 |
| 2010/0158238 | A1* | 6/2010 | Saushkin | G10L 25/48 379/265.12 |
| 2010/0205539 | A1* | 8/2010 | Gestsson | H04L 51/04 715/752 |
| 2010/0284522 | A1* | 11/2010 | Jaiswal | H04M 3/493 379/88.04 |
| 2011/0230196 | A1* | 9/2011 | Tal | H04M 3/42374 455/450 |
| 2012/0027194 | A1* | 2/2012 | Deshpande | H04M 3/493 379/265.01 |
| 2012/0213341 | A1 | 8/2012 | Jaiswal et al. | |
| 2014/0126706 | A1* | 5/2014 | Barbulescu | G06Q 30/0267 379/88.01 |
| 2014/0269258 | A1* | 9/2014 | Bischoff | H04L 45/28 370/221 |
| 2014/0270119 | A1* | 9/2014 | Bischoff | H04M 3/5183 379/265.09 |
| 2014/0270142 | A1* | 9/2014 | Bischoff | H04M 3/5237 379/265.09 |
| 2014/0270154 | A1* | 9/2014 | Lum | H04M 3/28 380/28 |
| 2014/0277598 | A1* | 9/2014 | Bischoff | H04M 3/523 700/20 |
| 2014/0280720 | A1* | 9/2014 | Bischoff | G06F 9/5072 709/217 |
| 2015/0110257 | A1* | 4/2015 | Barbulescu | G06Q 30/0272 379/88.02 |
| 2016/0149768 | A1* | 5/2016 | Hooshiari | G06Q 30/016 709/224 |
| 2016/0308916 | A1 | 10/2016 | Brombal et al. | |
| 2018/0084110 | A1* | 3/2018 | Fraizer | H04L 63/0421 |
| 2018/0241879 | A1* | 8/2018 | Badger | H04M 3/493 |
| 2019/0132447 | A1 | 5/2019 | Seppanen et al. | |
| 2020/0285427 | A1* | 9/2020 | Annamalai Thangaraj | H04N 1/00477 |
| 2021/0084158 | A1* | 3/2021 | Paiva | H04M 3/5233 |
| 2021/0136217 | A1* | 5/2021 | Paiva | G10L 15/22 |
| 2022/0294902 | A1* | 9/2022 | Soryal | H04M 3/493 |
| 2022/0353370 | A1* | 11/2022 | Anderson | H04L 65/1096 |
| 2023/0025405 | A1* | 1/2023 | Kim | H04L 65/403 |
| 2023/0035845 | A1* | 2/2023 | Chau | H04M 3/4936 |

* cited by examiner

RECONNECTING A CALLING DEVICE TO A STAGE OF AN INTERACTIVE VOICE RESPONSE SERVICE

CROSS-REFERENCE TO RELATED APPLICATION(S)

This disclosure is a continuation of U.S. patent application Ser. No. 17/390,657, filed Jul. 30, 2021, the entire disclosure of which is herein incorporated by reference.

BACKGROUND

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a unified communications as a service (UCaaS) platform, which includes several communications services integrated over a network, such as the Internet, to deliver a complete communication experience regardless of physical location.

SUMMARY

Disclosed herein are, inter alia, implementations of systems and techniques for message-based interactive voice response (IVR) menu reconnection.

One aspect of this disclosure is a method, which includes determining one or more menu options of an interactive voice response service presented during a call between a calling device and a destination including the interactive voice response service responsive to the calling device disconnecting from the call, transmitting a message including one or more selectable elements associated with the one or more menu options to the calling device, and connecting the calling device to a destination endpoint associated with a menu option of the one or more menu options responsive to a selection of a selectable element of the one or more selectable elements at the calling device.

Another aspect of this disclosure is an apparatus, which includes a memory and a processor configured to execute instructions stored in the memory to determine a node of a call path at which a calling device disconnected from a call. Responsive to the node representing an interactive voice response menu, the processor is configured to execute the instructions stored in the memory to transmit a first message including one or more first selectable elements associated with one or more menu options of an interactive voice response service presented during the call, and connect the calling device to a first destination endpoint associated with a menu option of the one or more menu options responsive to a selection of a selectable element of the one or more first selectable elements at the calling device. Responsive to the node representing an intended destination for the call, the processor is configured to execute the instructions stored in the memory to transmit a second messaging including a second selectable element associated with the intended destination, and connect the calling device to a second destination endpoint associated with the intended destination responsive to a selection of the second selectable element at the calling device.

Yet another aspect of this disclosure is a system, which includes a telephony system configured to facilitate a call between a calling device and a destination which uses an interactive voice response service, and a messaging system configured to transmit a message including one or more selectable elements associated with one or more call path nodes accessible through the interactive voice response service responsive to the calling device disconnecting from the call, and initiate a connection between the calling device and a destination endpoint associated with a call path node of the one or more call path nodes via the telephony system responsive to a selection of a selectable element of the one or more selectable elements at the calling device.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
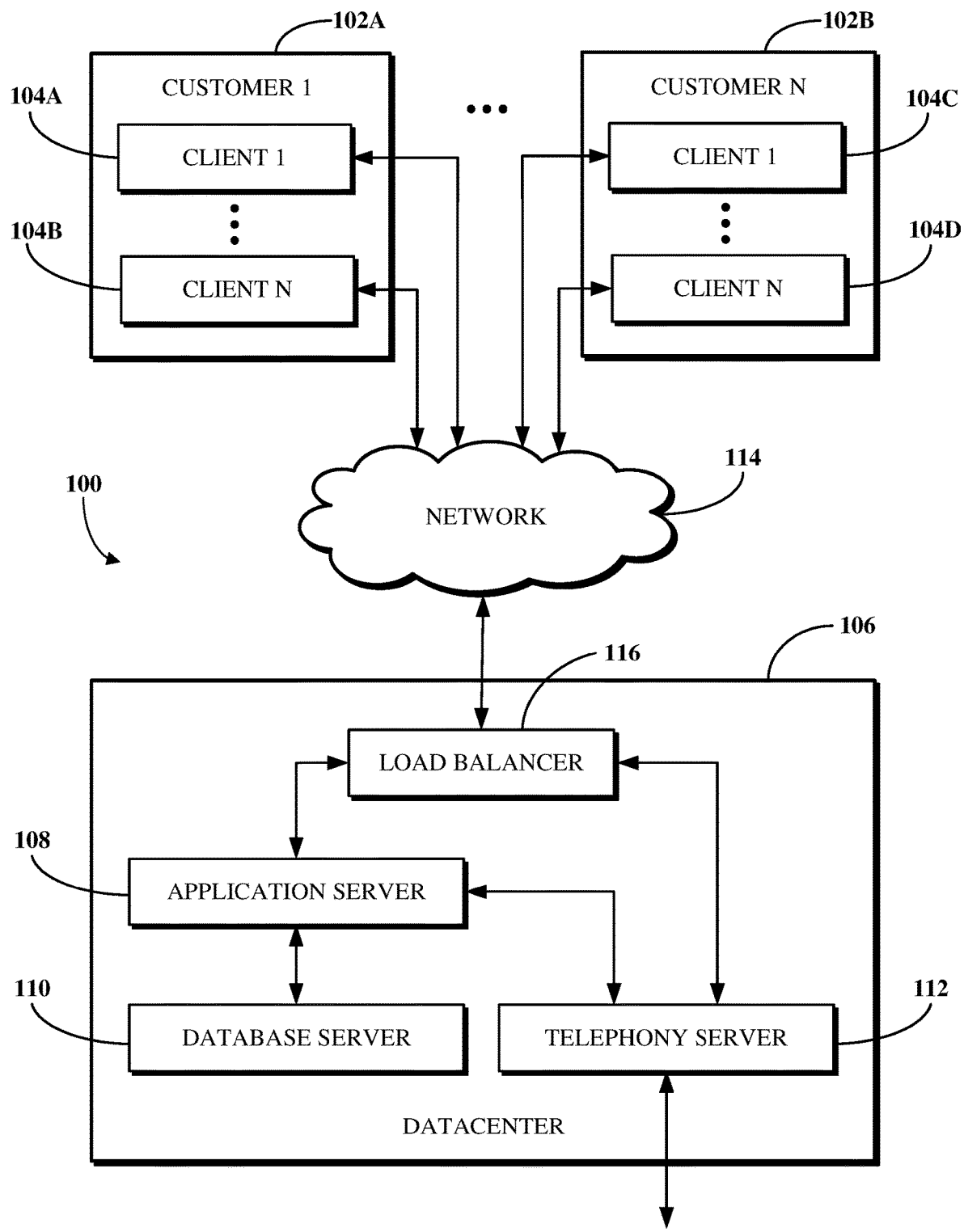
FIG. 1 is a block diagram of an example of an electronic computing and communications system.

Calls such as video calls and voice calls can be disconnected for a variety of reasons, for example, due to user error, network issues, or the like. Depending on the nature of the call, a disconnection can be particularly frustrating for the caller. In particular, where the caller is disconnected during a lengthy, multi-step IVR menu process or after traveling fully through same, the caller may feel frustrated by the fact that the caller must now call the number and traverse through the IVR menu process all over again. For example, the disconnection may occur after the caller has reached his or her intended destination through an IVR menu process. In another example, the disconnection may occur while the caller is traversing an IVR system, such as after indicating one or more menu option selections but before arriving at the intended destination. Depending on the caller's level of frustration, difficulties establishing a followup call, or the like, the caller may not desire to go through the process again, potentially resulting in a lost interaction for the destination service.

One approach to address this may include the caller providing a callback number to the destination service in the event of a voluntary or involuntary disconnection. For example, a destination service may offer to receive a callback number to allow the caller to disconnect for a time where hold times are expected to be long. However, this approach requires that the caller manually provide a callback number and that the caller has reached the intended destination before any disconnection occurs. Furthermore, this approach limits the resolution to a call back to the specified callback number.

Thus, using this existing approach, the service merely uses the callback number to establish a second call (i.e., the callback), relies upon that second call being answered in real-time, and does not provide a list of menu options for directing the caller to the intended destination. For example, if the second call is not answered (e.g., due to an involuntary disconnection that has not yet been resolved), the service may not make another attempt, and the caller will be forced to restart the entire process. The uncertainty of when the service will attempt this second call thus poses a challenge. Furthermore, the inability of this approach to address disconnections which occur before the caller has reached the intended destination necessarily requires that callers who are disconnected before reaching the intended destination try their call and traverse the IVR system again.

Implementations of this disclosure address problems such as these using message-based IVR menu reconnection. Message-based IVR menu reconnection is used to reconnect a calling device to a destination at a specific node of a call path after the calling device disconnects from a call with the destination. Menu options of an IVR service presented during a call between the calling device and the destination are determined responsive to the calling device disconnecting from the call. A message including one or more selectable elements each associated with one of the menu options is then transmitted to the calling device. Responsive to a selection of a selectable element at the calling device, the calling device is connected to a destination endpoint. Thus, where the calling device had partially or fully traversed an IVR service during the call, the message-based IVR menu reconnection disclosed herein enables the calling device to reconnect to the destination without having to repeat that IVR service traversal.

To describe some implementations in greater detail, reference is first made to examples of hardware and software structures used to implement a system for message-based IVR menu reconnection. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106. For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, such as for global routing for multiple datacenters. In some implementations, load balancers can be included both within and outside of the datacenter 106. In some implementations, the load balancer 116 can be omitted.

Figure 2:
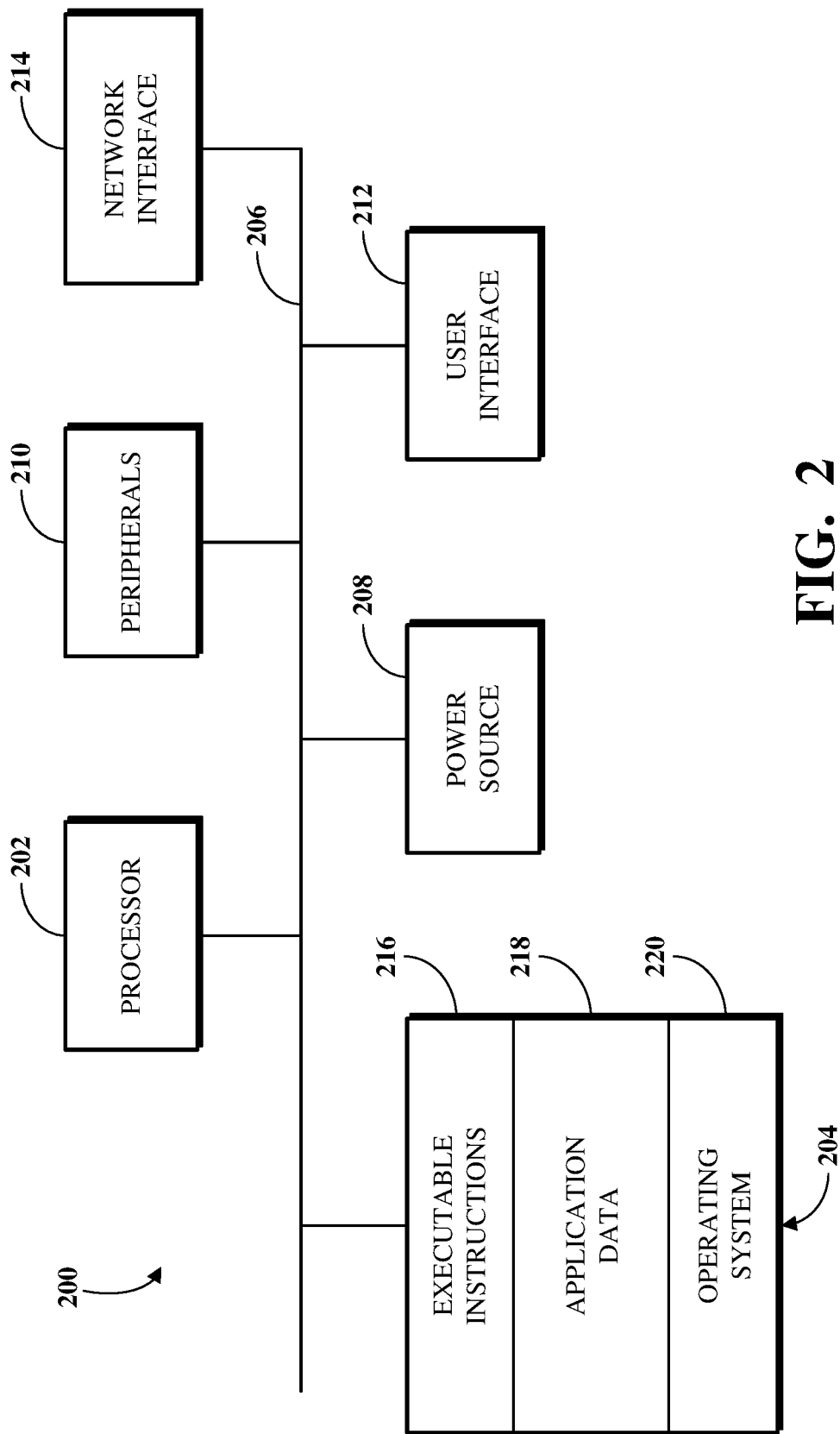
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
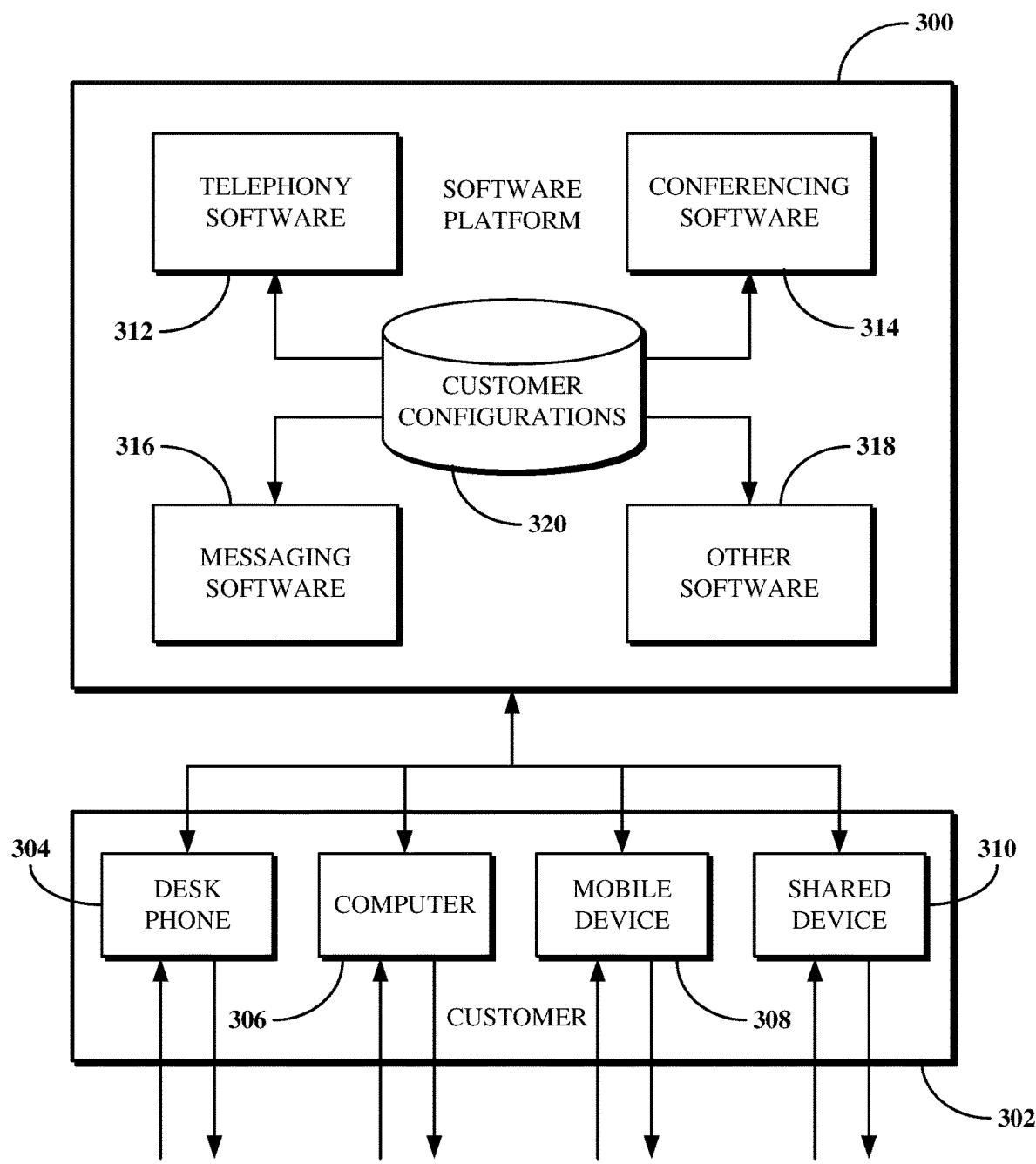
FIG. 3 is a block diagram of an example of a software platform implemented by an electronic computing and communications system.

FIG. 3 is a block diagram of an example of a software platform 300 implemented by an electronic computing and communications system, such as the system 100 shown in FIG. 1. The software platform 300 is a UCaaS platform accessible by clients of a customer of a UCaaS platform provider, such as the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). In some such cases, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include message-based IVR menu reconnection software for transmitting messages including selectable elements associated with IVR menu options responsive to a disconnection of a calling device from a call to a destination and for connecting the calling device to a destination endpoint associated with one of those IVR menu options based on a selection of a corresponding one of the selectable elements at the calling device.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
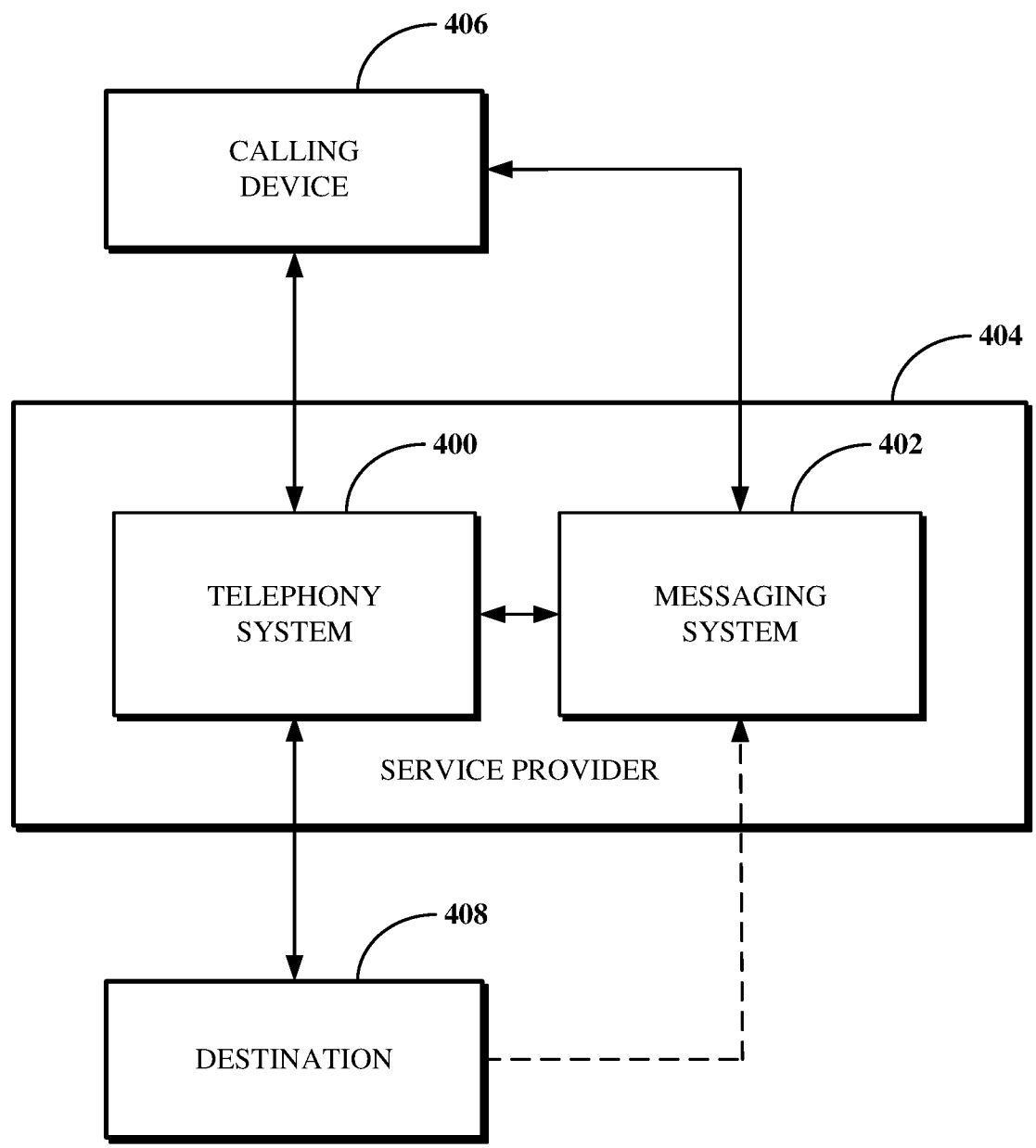
FIG. 4 is a block diagram of an example of a system for message-based IVR menu reconnection.

FIG. 4 is a block diagram of an example of a system for message-based IVR menu reconnection. The system includes a telephony system 400 and a messaging system 402, which may be provided by a service provider 404. The service provider 404 is an entity which implements, operates, controls, facilitates, or otherwise provides a software platform, for example, the software platform 300 shown in FIG. 3.

The telephony system 400 includes hardware and/or software for facilitating telephony communications. For example, the telephony system 400 may be or include the telephony server 112 shown in FIG. 1 and/or may run or implement the telephony software 312 shown in FIG. 3. For example, the telephony system 400 may be used to facilitate a telephone call from a calling device 406 to a destination 408. The calling device 406 is a device configured to make telephone calls, for example, a desk phone device, a mobile phone device, or a device running a softphone. The destination 408 is or refers to one or more phone devices, computing devices, network elements, and/or the like reachable by dialing a phone number associated therewith. The messaging system 402 includes hardware and/or software for facilitating message-based IVR menu reconnection responsive to a disconnection of the calling device 406 from the call with the destination 408. For example, the messaging system 402 may be or include the application server 108 shown in FIG. 1 and/or may run or implement the other software 318 shown in FIG. 3.

The messaging system 402 runs message-based IVR menu reconnection software which transmits messages including selectable elements associated with IVR menu options from the destination 408 to the calling device 406 responsive to a disconnection of the calling device 406 from a call to the destination 408 and which connects the calling device 406 to a destination endpoint of the destination 408 based on a selection of one of the selectable elements at the calling device 406, in which the destination endpoint is associated with the one of those IVR menu options which corresponds to the selected selectable element.

In particular, the destination 408 may implement an IVR service which includes one or more IVR menus and ultimately ends at an intended destination reached by traversing those one or more IVR menus. The intended destination is implemented by a destination endpoint, such as one or more telephony, computing, network, or other devices or elements, and is where the operator of the calling device 406 directs the call through the IVR service to be able to get sought after information, speak to a specific person or type of person, or otherwise access a service. The operator of the calling device 406 may place a call to the destination 408, which then sequentially presents the one or more IVR menus to the operator of the calling device 406 over the call to allow the operator of the calling device 406 to guide the call to the intended destination based on a selection of a menu option at each of the IVR menus. The menu options may be selected by the operator of the calling device 406 pressing numbers on a dial pad, speaking all or a portion of the menu options, or in another manner.

For example, the destination 408 may be associated with a company with which the operator of the calling device 406 does business. When the operator of the calling device 406 dials a telephone number associated with the destination 408, an IVR service implemented by or for the destination 408 presents a first IVR menu, such as to determine the destination endpoint to which to direct the call. The first IVR menu presents one or more menu options for this purpose. For example, the first IVR menu may ask the operator of the calling device 406 to indicate whether their call is for billing (e.g., a first menu option accessed by the operator of the calling device 406 pressing 1 or saying "billing"), sales (e.g., a second menu option accessed by the operator of the calling device 406 pressing 2 or saying "sales"), customer service (e.g., a third menu option accessed by the operator of the calling device 406 pressing 3 or saying "customer service"), and so on.

Thereafter, and based on the particular menu option selected by the operator of the calling device 406, the IVR service may then connect the call to the intended destination associated with the selected menu option or present a second IVR menu to further determine the destination endpoint to which to direct the call. The second IVR menu presents one or more menu options which may be different from the one or more menu options presented by the first menu. In particular, the menu options presented by the second IVR menu will likely correspond to the category of service associated with the menu option selected from the first IVR menu. For example, where the operator of the calling device 406 selected the menu option for "sales" previously, the second IVR menu may include menu options to indicate whether the call is related to products already used by the operator of the calling device 406 (e.g., by a first menu option accessed by the operator of the calling device 406 pressing 1 or saying "existing products"), products not yet in use by the operator of the calling device 406 (e.g., by a second menu option accessed by the operator of the calling device 406 pressing 2 or saying "new products"), and so on. The intended destination is eventually reached once the operator of the calling device 406 has traversed through all of the IVR menus in a call path defined by the menu options selected at each of the IVR menus.

The IVR service is implemented using one or more nodes. A node may be, include, or represent a given stage within a call path that includes the one or more IVR menus and the intended destination. Accordingly, a node may be, include, or represent an IVR menu or the intended destination. A call path may thus include at least two nodes, in which at least one node is, includes, or represents an IVR menu and one node represents the intended destination. The IVR service for the destination 408 may have multiple call paths, or otherwise multiple call paths may be associated with the destination 408, in which each of the multiple call paths includes a different set of nodes. In some cases, two or more of the multiple call paths may have the same final node representing the same intended destination; however, those two or more call paths will have different nodes preceding the final node, thus representing different call paths taken through IVR menus of the IVR service.

In the example described above in which the operator of the calling device 406 selects a menu option at the first IVR menu and another menu option at the second IVR menu before arriving at the intended destination, the call path for that call includes three nodes in which a first node is, includes, or represents the first IVR menu, a second node is, includes, or represents the second IVR menu, and a third node is, includes, or represents the intended destination.

For the call between the calling device 406 and the destination 408, the telephony system 400 maintains a record of the call path including the current node at which the call is at a given time and any past nodes through which the call has already traveled. For example, the telephony system 400 may maintain a temporary data store including records which are generated for calls and which are deleted after some event has occurred or after some time period has expired. For example, a record may be deleted after an amount of time has passed since the call started or ended. In another example, a record may be deleted after a call is determined to have ended by the voluntary disconnection of one or more parties thereto.

In the event that the calling device 406 disconnects from the call at some point in time, the record of the call path is used to determine the node at which the call was at the time of the disconnection. Thus, the record of the call path can be used to indicate which call path the calling device 406 was on and how far along that call path the calling device 406 was before the disconnection occurred. The disconnection is likely an involuntary disconnection, such as due to network issues, other connectivity issues, or operator error (e.g., by the operator of the calling device 406 unintentionally terminating the call such as by pressing a button to hang up the call). However, in some cases, the disconnection may be voluntary, such as due to the operator of the calling device 406 intentionally terminating the call, in which case the disconnection may have occurred before the call was completed such as before the operator of the calling device 406 achieved the desired goal from the call (e.g., completing a conversation with someone, hearing a set of information, or the like).

The telephony system 400 detects the disconnection of the calling device 406 from the call with the destination 408. Responsive to that disconnection of the calling device from the call, the telephony system 400 can signal an indication of the disconnection along with the record of the call path up to the time of the disconnection to the messaging system 402. The messaging system 402, using the message-based IVR menu reconnection software, then performs operations for connecting the calling device 406 to a destination endpoint associated with an IVR menu option presented during the call between the calling device 406 and the destination 408. To do so, the messaging system 402 determines one or more IVR menu options which were presented to the calling device 406 based on the record of the call path signaled from the telephony system 400, generates a message including one or more selectable elements associated with those IVR menu options, transmits that message to the calling device 406, receives a selection of one of those selectable elements from the calling device 406, and determines the destination endpoint with which to connect the calling device 406 based on the selection received from the calling device 406.

In particular, the messaging system 402 uses the record of the call path signaled from the telephony system 400 to determine the node of the call path that the calling device 406 was on at the time of the disconnection. The node of the call path that the calling device 406 was on at the time of the disconnection may, for example, be represented as the latest node added to the record of the call path. Where that node is an IVR menu, the messaging system 402 generates a message including selectable elements associated with the IVR menu options which were presented or in the process of being presented from that IVR menu to the calling device 406. Alternatively, where that node is an intended destination, the messaging system 402 generates a message including selectable elements associated with the IVR menu options presented at the previous node, which was an IVR menu, along with an indication of which of those IVR menu options was previously selected during the call to connect the calling device 406 to the intended destination. The message may, for example, be a short message service (SMS) message, such as a text message. The messaging system 402 then transmits that message to the calling device 406.

The selectable elements are interactive user interface elements. In particular, the selectable elements are user interface elements which are linked to a service, telephone number, address, or other aspect usable to connect the calling device 406 and a destination endpoint when selected at the calling device 406. For example, the selectable elements may include links to different destination endpoints associated with the different IVR menu options determined based on the record of the call path. The links may be expressed using text such that each selectable element is represented by text indicating the IVR menu option with which it is associated. Alternatively, the links may be expressed as actual telephone numbers, addresses, or the like with text indicating the associated IVR menu option appearing nearby. The links may, for example, connect to telephone extensions associated with the destination endpoints.

The messaging system 402 receives an indication of the selectable element selected at the calling device 406. For example, the calling device 406 may reply to the message by sending a message indicating the selected selectable element back to the messaging system 402. The messaging system 402 may then cause the telephony system 400 to initiate a new call between the calling device 406 and the destination endpoint associated with the selected selectable element. In another example, the messaging system 402, using the message-based IVR menu reconnection software, may be configured as an intermediary for receiving the indication of the selectable element from the calling device 406. For example, each of the selectable elements may initially route to the messaging system 402, which then routes the connection with the calling device 406 to the applicable destination endpoint. The messaging system 402 may then transmit data to the destination endpoint to cause the destination endpoint to initiate a new call via the telephony system 400 with the calling device 406.

A new call is established between the calling device 406 and the destination endpoint associated with the selected selectable element. The operator of the calling device 406 is thus able to continue the call which was previously disconnected.

In some implementations, the telephony system 400 may include the messaging system 402. For example, the messaging system 402 may be implemented using telephony hardware and/or software, messaging hardware and/or software, or both. For example, the message-based IVR menu reconnection software or functionality thereof may be run at or by the telephony system 400.

In some implementations, the disconnection of the calling device 406 from the call with the destination 402 may be signaled to the messaging system 408 by the destination 402. For example, one or more telephony, computing, network, or other aspects at the destination 402 may detect that the call with the calling device 406 has ended and signal that disconnection to the messaging system 408 responsive thereto.

In some implementations, the record of the call path may not be signaled to the messaging system 402 by the telephony system 400. For example, the messaging system 402, using the message-based IVR menu reconnection software, may retrieve the record of the call path from the telephony system 400.

In some implementations, the indication of the disconnection may not be signaled to the messaging system 402 by the telephony system 400. For example, the messaging system 402, through the message-based IVR menu reconnection software or otherwise, may include or otherwise use an agent which listens to the call facilitated by the telephony system 400 to detect whether and when the calling device 406 disconnects from the call between the calling device 406 and the destination 408.

In some implementations, a selectable element within a message transmitted to the calling device 406 may link to a server implementing the web service which implements the destination, a portion thereof, or a service associated therewith. For example, one or more services available by the destination 408 may be implemented using a web service. The web service may, for example, be accessible by dialing a telephone number associated with the destination 408 and/or by traversing an IVR system of the destination 408.

In some implementations, the telephony system 400 may be omitted, and the calling device 406 may be a device which accesses a web service associated with the destination 408. For example, the device may connect to a web portal with traversable menus, each menu having one or more menu options. The operator of the device may traverse through a path of the menus of the web portal before the device disconnects from the web portal, for example, due to network issues, connection issues, operator error, or another issue or error. Responsive to determining that the device has disconnected from the web portal, a telephone number or other identifier associated with the device may be obtained, such as by a known mapping of the IP address of the device to a telephone number within a service provider system or otherwise. A message including one or more selectable elements as described above but connecting to aspects of the web service is then transmitted to the device, such as over SMS. The device may then be reconnected to the web service based on a connection of the device to an endpoint which implements the service associated with the selected selectable element.

Figure 5:
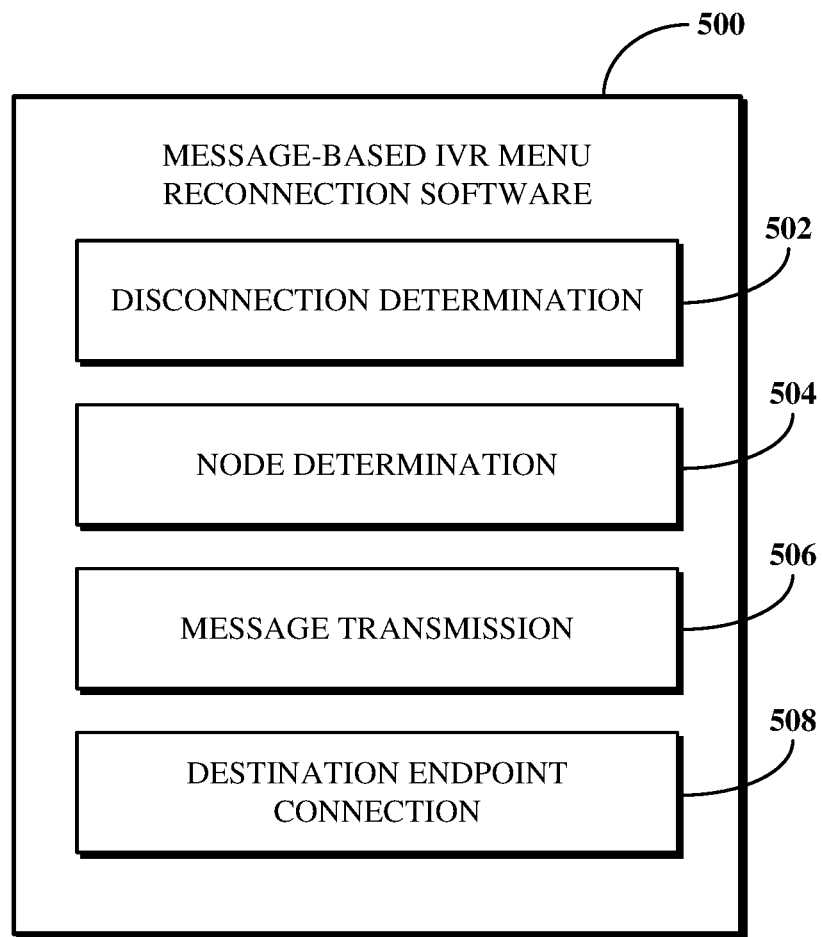
FIG. 5 is a block diagram of example functionality of message-based IVR menu reconnection software.

FIG. 5 is a block diagram of example functionality of message-based IVR menu reconnection software 500. The message-based IVR menu reconnection software 500 may, for example, be message-based IVR menu reconnection software run by or at the messaging system 402 shown in FIG. 4. The message-based IVR menu reconnection software 500 includes a disconnection determination tool 502, a node determination tool 504, a message transmission tool 506, and a destination endpoint connection tool 508.

The disconnection determination tool 502 determines a disconnection of a calling device, for example, the calling device 406 shown in FIG. 4, from a call with a destination, for example, the destination 408 shown in FIG. 4. To determine the disconnection of the calling device, the disconnection determination tool 402 receives an indication of the disconnection and/or detects the disconnection itself.

Where the disconnection determination tool 502 receives an indication of the disconnection, the disconnection may be detected from a telephony system which detected the disconnection of the calling device from the call with the destination. For example, the telephony system may detect the disconnection of the calling device based on a determination that a SIP transaction with the calling device has ended. In such a case, the SIP transaction ending may indicate that a channel has closed between the calling device and the telephony system. In another example, the telephony system may detect the disconnection of the calling device based on a session close indication or session timeout indication from the calling device and/or an endpoint associated with the destination. The telephony system in either case then indicates the disconnection to the disconnection determination tool 502.

Alternatively, where the disconnection determination tool 502 detects the disconnection of the calling device from the call with the destination, the disconnection determination tool 502 may be part of the telephony system or may include or use an agent which listens to the telephony system such as to determine that a SIP transaction with the calling device has ended, to identify a session close indication or session timeout indication from one or both of the calling device or the endpoint associated with the destination, or the like. In such a case, the telephony system may not actively indicate the disconnection to the disconnection determination tool 502.

The node determination tool 504 determines the node of the call path the calling device was on at the time of the disconnection. The node determination tool 504 may access a record of the call path to determine the node or receive the record of the call path from the telephony system to determine the node. For example, where the node determination tool 504 receives the record of the call path from the telephony system, the telephony system may transmit the record of the call path or information thereof separately from or concurrently with an indication of the disconnection of the calling device from the call. In another example, where the node determination tool 504 accesses the record of the call path itself, the node determination tool 504 may be part of the telephony system or may include or use an agent which is configured to access a data store which stores records of call paths.

Once the record of the call path available, the node determination tool 504 uses the record of the call path to determine the node of the call path which the calling device was on at the time of the disconnection. For example, the node determination tool 504 may identify the node which the calling device was on at the time of the disconnection based on a latest entry within the record of the call path, an entry within the record of the call path which has a latest timestamp, the node corresponding to the only entry within the record of the call path which does not identify an menu option selected at the calling device, or the like. The node determination tool 504 further determines the type of the node which the calling device was on at the time of the disconnection. For example, the node may be an IVR menu type in which the node represents an IVR menu with one or more menu options. In another example, the node may be a destination type in which the node represents an intended destination reached by the calling device fully traversing through one or more IVR menus.

The message transmission tool 506 transmits a message including selectable elements to the calling device. Depending on the node type of the node determined by the node determination tool 504 as the node of the call path which the calling device was on at the time of the disconnection, the selectable elements may be associated with menu options of an IVR menu reached by the calling device, an intended destination reached by the calling device, or both. For example, where the node type of that node is an IVR menu type, the one or more selectable elements in the message transmitted to the calling device may include selectable elements which are associated with menu options of the IVR service, in particular, the menu options presented at that node at which the calling device was at the time of disconnection from the call. In another example, where the node type of that node is a destination type, the one or more selectable elements in the message may include a single selectable element which is associated with the intended destination reached by the calling device traversing the various IVR menus of the IVR service. In yet another example, where the node type of that node is a destination type, the one or more selectable elements in the message may include a selectable element which is associated with that intended destination and one or more selectable elements associated with menu options of an IVR menu preceding the intended destination in the call path.

To generate the message, the message transmission tool 506 (or another aspect of the message-based IVR menu reconnection software 500, as the case may be) first identifies destination endpoints which are used to implement the various services associated with the subject node. The destination endpoints may include telephony, computing, or other devices used to implement further IVR menus or intended destinations as may be accessed by one of the IVR menu options presented at that node. The destination endpoints may be identified based on a mapping, a record within a data store (e.g., the record of the call path or another record), or using information obtained from a telephony system which implemented the call between the calling device and the destination. For example, the destination endpoints may have associated telephone extensions. In another example, the destination endpoints may have associated web addresses.

Where the message is a SMS message such as a text message, the message transmission tool 506 uses a SMS service to transmit the message to the calling device. Alternatively, where the message is a chat message, an instant message, an email, or another message type, the message transmission tool 506 uses a web service associated with such a message type to transmit the message to the calling device.

The destination endpoint connection tool 508 connects the calling device to a destination endpoint associated with a selectable element selected at the calling device within the message transmitted by the message transmission tool 506. In particular, responsive to a selection of a selectable element at the calling device, the messaging system implementing the message-based IVR menu reconnection software 500 receives an indication of the selected selectable element. Using that indication, the destination endpoint connection tool 508 identifies an endpoint associated with the destination which is used to implement a service associated with the selected selectable element.

The selection of the selectable element at the calling device may be considered a request to connect to that destination endpoint received from the calling device. The destination endpoint connection tool 508 performs an authentication operation to verify that the request to connect to that destination endpoint came from the calling device. For example, the destination endpoint connection tool 508 may operate as an intermediary to receive the request to connect to the destination endpoint from the calling device to verify it is a valid request before allowing the calling device to connect to that destination endpoint.

In some implementations, the authentication operation may further verify that the request to connect to that destination endpoint came from the calling device within a threshold period of time from a time at which the message was transmitted to the calling device. For example, the authentication operation may deem the request to connect to that destination endpoint invalid where it is sent too long after the message including the selectable elements was transmitted to the calling device. In some implementations, the destination endpoint connection tool 508 may be omitted. For example, the calling device may be directly linked to the subject destination endpoint responsive to the selection of the selectable element at the calling device.

In some implementations, the message-based IVR menu reconnection software 500 may include other tools in addition to and/or instead of the tools 502 through 508. Although the tools 502 through 508 are shown as functionality of the message-based IVR menu reconnection software 500 as a single piece of software, in some implementations, some or all of the tools 502 through 508 may exist outside of the message-based IVR menu reconnection software 500 and/or the software platform may exclude the message-based IVR menu reconnection software 500 while still including the some or all of tools 502 through 508 in some form elsewhere.

Figure 6:
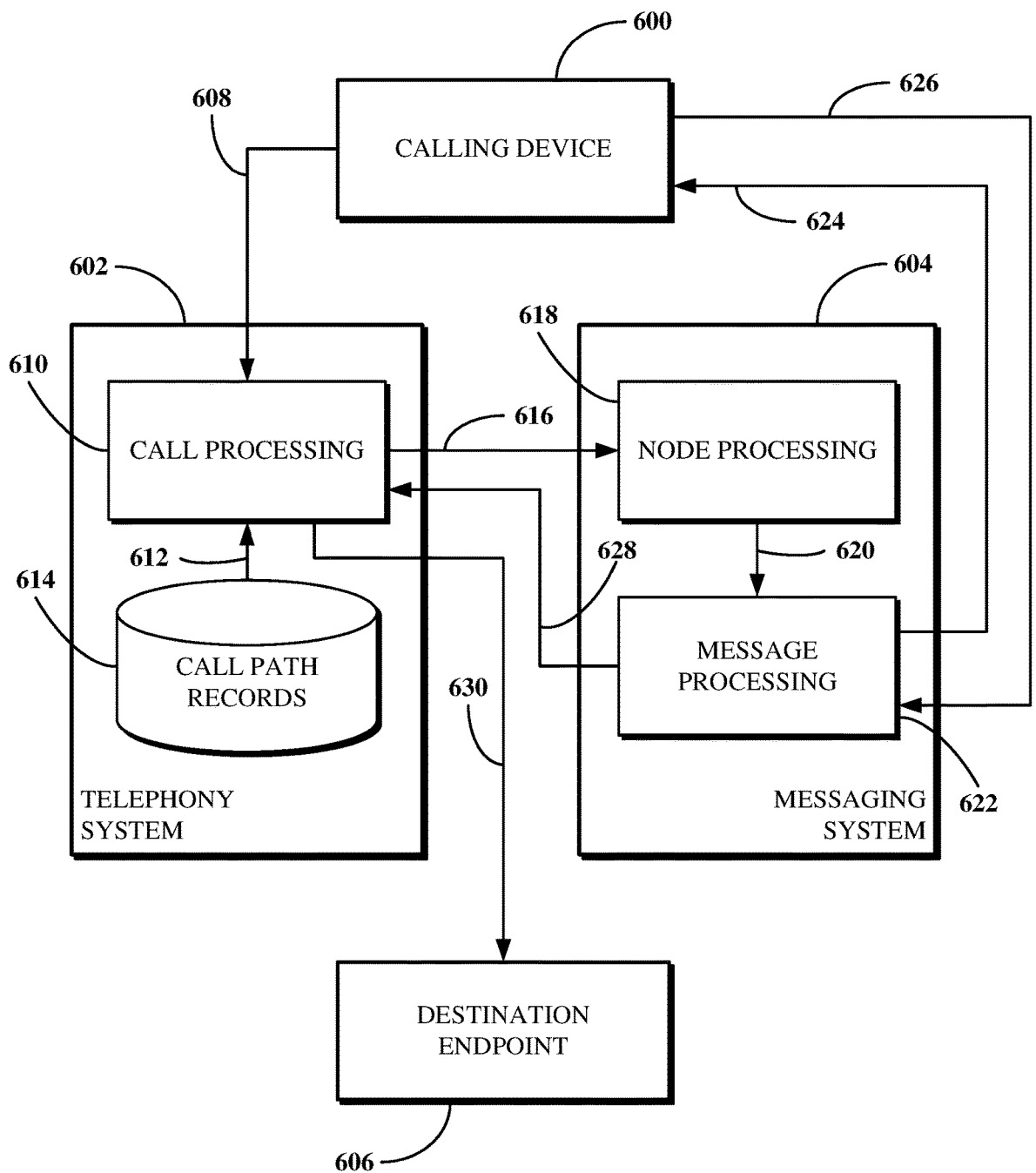
FIG. 6 is a block diagram of an example of exchanges between a calling device, a telephony server, and a messaging server for message-based IVR menu reconnection.

FIG. 6 is a block diagram of an example of exchanges between a calling device 600, a telephony system 602, and a messaging system 604 for message-based IVR menu reconnection. The exchanges are performed to connect the calling device 600 to a destination endpoint 606 associated with a selection of a selectable element at the calling device 600. The calling device 600, the telephony system 602, and the messaging system 604 may, for example, respectively be the calling device 406, the telephony system 400, and the messaging system 402 shown in FIG. 4.

A first request 608 is transmitted from the calling device 600 to call processing components 610 of the telephony system 602 to initiate the call between the calling device 600 and the destination, which may, for example, be the destination 408 shown in FIG. 4. During the call, the call processing components 610, which may include one or more telephony aspects described with respect to the telephony server 112 shown in FIG. 1, detect a disconnection of the calling device 600 from the call. Based on the disconnection, the call processing components 610 retrieve, such as by a transmission 612, a record of a call path for the call from a call path record data store 614.

The call processing components 610 then transmit an indication 616 of the disconnection of the calling device 600 from the call along with the record of the call path to node processing components 618 of the messaging system 604. The node processing components 618, which may, for example, include one or more aspects of the message-based IVR menu reconnection software 500 shown in FIG. 5, determine a node of the call path at which the calling device 600 was when it disconnected from the call based on the record of the call path. The node processing components 618 thereafter determine the selectable elements to include in a message to the calling device 600, such as based on menu options associated with that node, whether an intended destination was reached at that node, and the like.

The node processing components 618 then provide 620 information associated with the selectable elements to message processing components 622 of the messaging system, which may, for example, include one or more aspects of the message-based IVR menu reconnection software 500 shown in FIG. 5. The message processing components 622 transmit a message 624 to the calling device 600 and responsively receive a selection 626 of a selectable element within that message from the calling device 600. The destination endpoint 606 is associated with that selectable element. The selection 626 may include or otherwise be considered as a request to connect the calling device 600 with the destination endpoint 606.

Responsive to the selection 626, the messaging processing components 622 initiate 628 a connection between the calling device 600 and the destination endpoint via the call processing components 610, such as by causing the call processing components 610 to establish a new call between the calling device 600 and the destination endpoint 606. The call processing components transmit a request 630 for connecting the new call to the destination endpoint 606. Once the new call is established, the operator of the calling device 600 may interact with the destination endpoint 606, effectively resuming the previously disconnected call at the same node of the call path or at a subsequent node thereof.

In some implementations, the message processing components 622 may perform an operation other than causing the call processing components 610 to establish a new call between the calling device 600 and the destination endpoint 606 based on an amount of time which has elapsed between when the message 624 is transmitted to the calling device 600 and when the selection 626 is received from the calling device 600. For example, the messaging processing components 622 can track a start time at which the message 624 is transmitted to the calling device 600 and an end time at which the selection 626 is received from the calling device 600. The messaging processing components 622 can then compare the total amount of time between that start time and that end time against a threshold (e.g., one hour) to determine whether a delay resulting in an end of the session with the destination endpoint has occurred.

In some such implementations, where that total amount of time between that start time and that end time exceeds the threshold, the messaging processing components 622 may connect the calling device 600 with an agent of the destination endpoint regardless of the selection 626. For example, the messaging processing components 622 can connect the calling device 600 with an agent device over a chat modality based on the threshold being exceeded. In another example, the messaging processing components 622 can connect the calling device 600 with an agent device over a new call other than at the IVR menu option or destination represented by the selection 626.

Figure 7A:
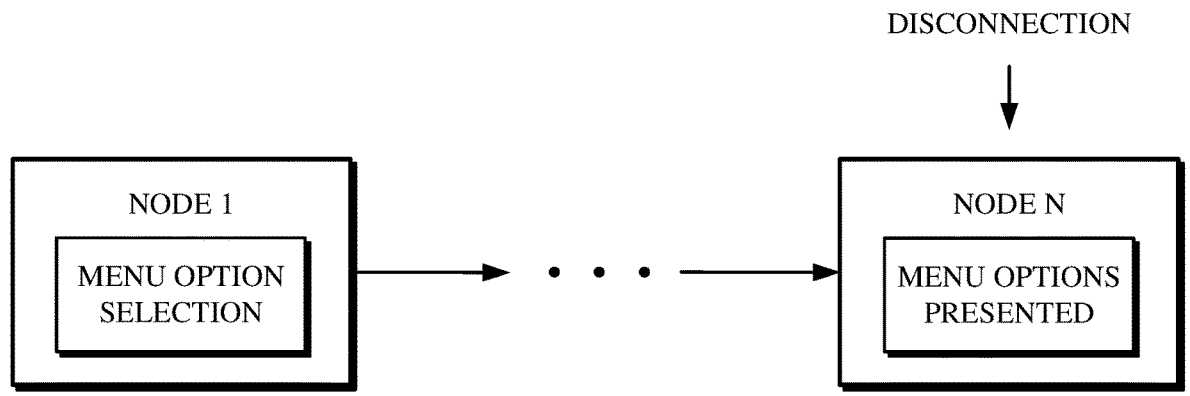
FIGS. 7A-B are block diagrams of examples of nodes representing the call path of a calling device through an IVR system.
Figure 7B:
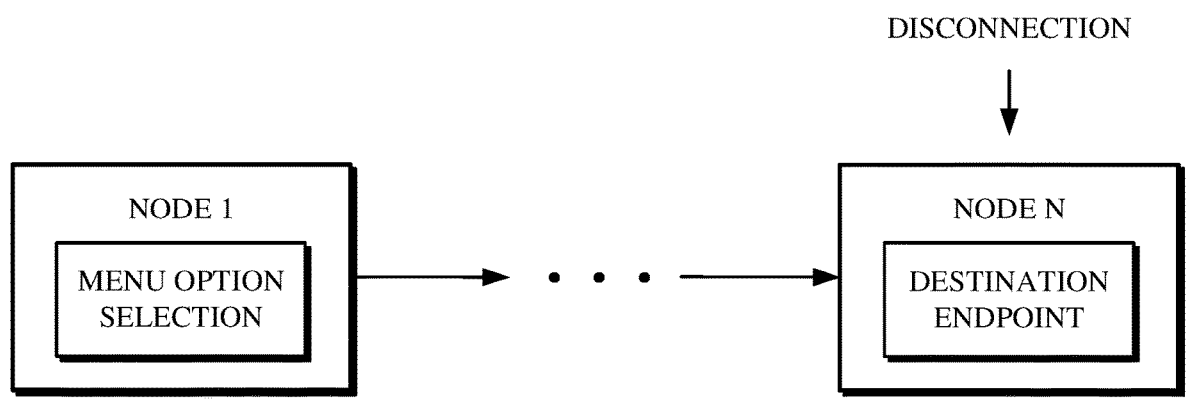

FIGS. 7A-B are block diagrams of examples of nodes representing the call path of a calling device through an IVR system. Referring first to FIG. 7A, a call path for the calling device begins at a Node 1 with the selection of an IVR menu option at the calling device. At the time of disconnection, the call path was at a Node N in which further IVR menu options were presented, but for which a selection at the calling device was not yet made. A message transmitted to the calling device may thus include selectable elements associated with the menu options at the Node N. The value of N is an integer greater than or equal to two.

Referring next to FIG. 7B, a call path for the calling device begins at a Node 1 with the selection of an IVR menu option at the calling device. At the time of disconnection, the call path was at a Node N in which the calling device was connected with a destination endpoint implementing the intended destination for the call. Thus, in this example, the calling device fully traversed one or more IVR menus in the call path to arrive at the intended destination before the disconnection occurred. A message transmitted to the calling device may thus include selectable elements to return the calling device to the destination endpoint. In some cases, the message may further include selectable elements associated with menu options from the IVR menu represented by Node N−1 to provide the operator of the calling device with further options for reconnecting to the destination. The value of N is an integer greater than or equal to two.

Although the example call paths shown in FIGS. 7A and 7B depict a disconnection occurring at a node after a first node (e.g., Node 1 in each), in some cases, the disconnection of the calling device may occur when the calling device is at such a first node. In some implementations, where a calling device is determined to have disconnected from a call at a first such node (e.g., during a first IVR menu), the message transmitted to the calling device may include a selectable element configured to initiate a second call to the destination by causing a telephone application of the calling device to open and dial the telephone number previously dialed by the operator of the calling device to reach that first node.

Figure 8:
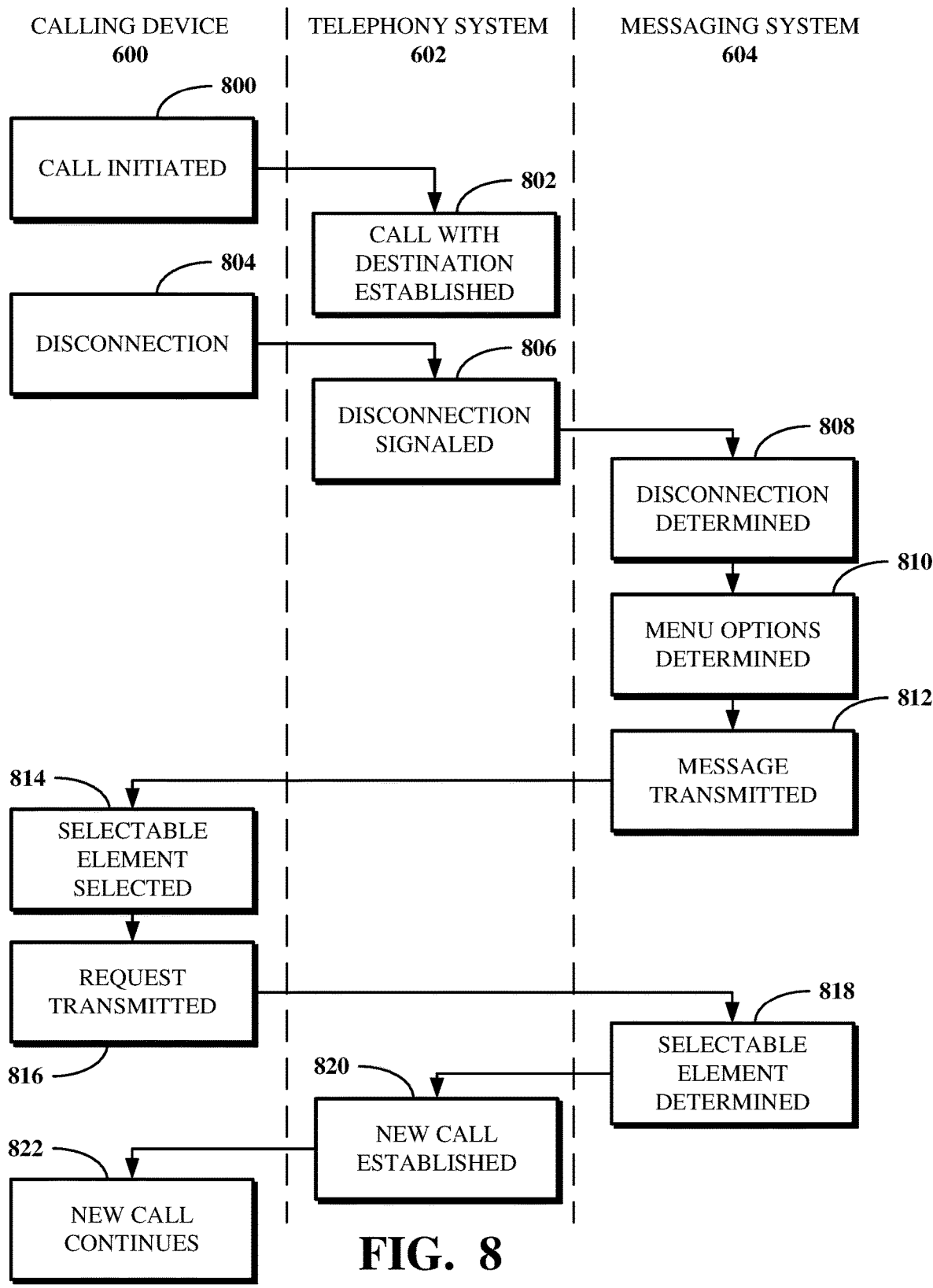
FIG. 8 is an illustration of swim lanes showing an example sequence of operations performed for message-based IVR menu reconnection.

FIG. 8 is an illustration of swim lanes showing an example sequence of operations performed for message-based IVR menu reconnection. For example, the sequence of operations describes operations performed as part of one or more exchanges between the calling device 600, the telephony system 602, and the messaging system 604 shown in FIG. 6.

At 800, a call to a destination is initiated at the calling device 600. At 802, the call with the destination is established via the telephony system 602. Sometime thereafter, at 804, the calling device 600 disconnects from the call. At 806, the telephony system 602 signals the disconnection of the calling device 600 to the messaging system 604. At 808, the messaging system 604 determines that the calling device has disconnected from the call with the destination. At 810, the messaging system 604 determines menu options associated with a node in the call path at which the calling device 600 was when it disconnected from the call, in which the menu options may be IVR menu options or options associated with an intended destination reached by the calling device before the disconnection, based on the node type of the node.

At 812, a message including selectable elements associated with the menu options is transmitted to the calling device 600. At 814, one of the selectable elements is selected at the calling device 600. At 816, based on the selection of the selectable element, a request to connect to a destination endpoint associated with that selectable element is transmitted from the calling device 600. At 818, the selectable element selected at the calling device 600 is determined at the messaging system 604. At 820, the telephony system 602, based on data, a command, or the like transmitted from the messaging system 604, establishes a new call between the calling device 600 and the destination resuming at the node at which the calling device 600 previously disconnected or a subsequent node in the call path, based on the particular selectable element that was selected. At 822, the new call continues between the calling device 600 and the destination.

In some implementations, the signaling of the disconnection by the telephony system 602 at 806 may be omitted. For example, the messaging system 604 may be able to detect the disconnection of the calling device 600 from the call without information signaled from the telephony system 602, such as using an agent or other listening aspect.

In some implementations, the determination of the selectable element at 818 may be omitted. For example, the request to connect to the destination endpoint associated with the selected selectable element may not be routed through the messaging system 604, but instead directly transmitted to the destination endpoint via the telephony system 602 or otherwise.

Figure 9:
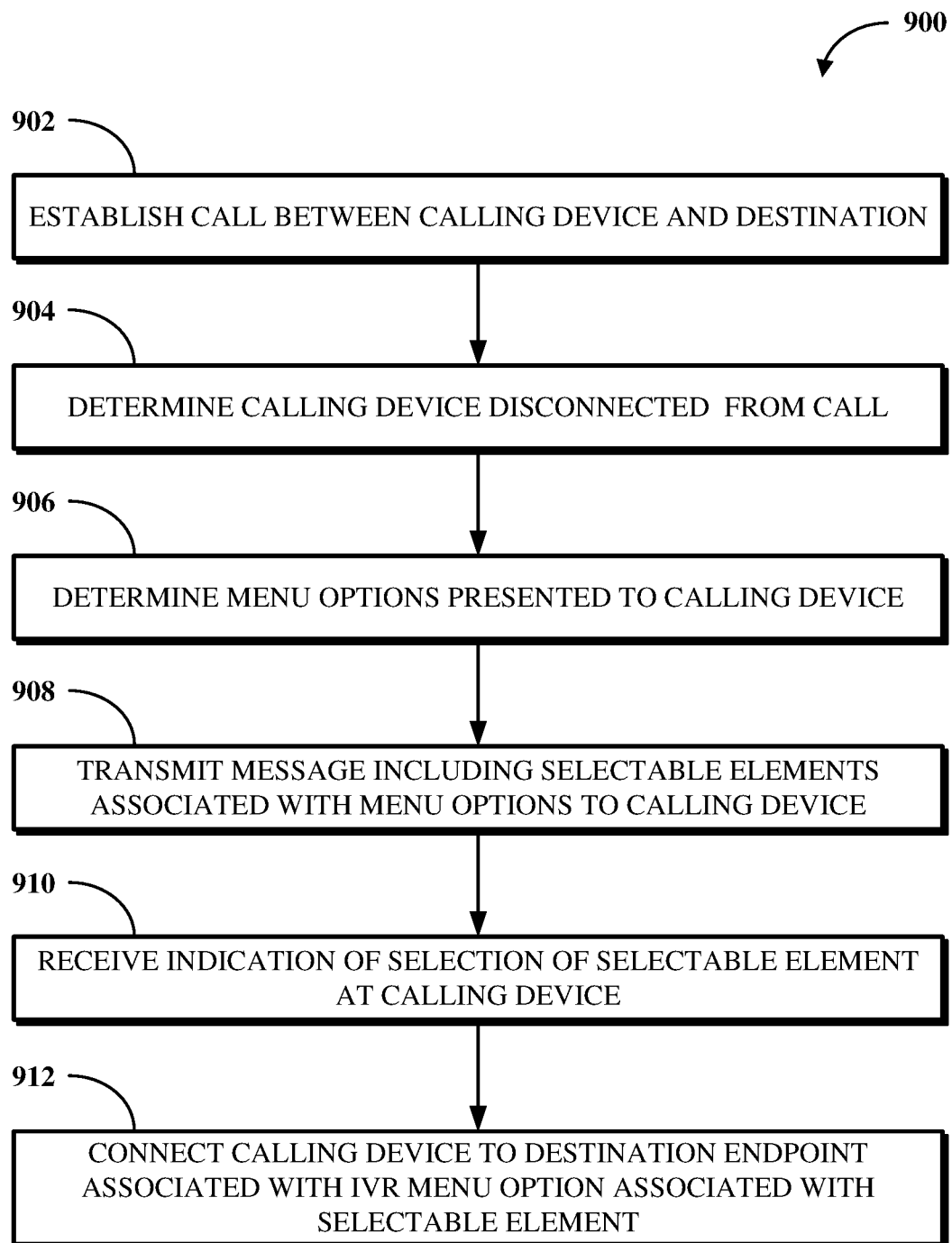
FIG. 9 is a flowchart of an example of a technique for message-based IVR menu reconnection.

To further describe some implementations in greater detail, reference is next made to examples of techniques which may be performed by or using message-based IVR menu reconnection. FIG. 9 is a flowchart of an example of a technique 900 for message-based IVR menu reconnection. The technique 900 can be executed using computing devices, such as the systems, hardware, and software described with respect to FIGS. 1-8. The technique 900 can be performed, for example, by executing a machine-readable program or other computer-executable instructions, such as routines, instructions, programs, or other code. The steps, or operations, of the technique 900 or another technique, method, process, or algorithm described in connection with the implementations disclosed herein can be implemented directly in hardware, firmware, software executed by hardware, circuitry, or a combination thereof.

For simplicity of explanation, the technique 900 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 902, a call is established between a calling device and a destination. For example, the call may be initiated by an operator of the calling device dialing a telephone number associated with the destination. Telephony services of a telephony system may be used to facilitate the call between the calling device and the destination.

At 904, a determination is made that the calling device disconnected from the call. The determination may be based on a detection by the telephony system that the calling device has disconnected and/or based on a detection by a messaging system listening to the call. The disconnection may be detected based on a termination of a SIP transaction with the calling device, a session termination or timeout indication, or in another manner.

At 906, menu options which were presented to the calling device are determined responsive to the disconnection of the calling device from the call. A record of a call path indicating the nodes of the IVR service of the destination which were traversed by the calling device before the disconnection thereof from the call are obtained by the messaging system and used to determine the node of the call path at which the calling device was when it disconnected from the call. The messaging service determines the node type of that node and determines the menu options based on that node type.

At 908, a message including selectable elements associated with the IVR menu options which were presented to the calling device is transmitted to the calling device. The message may, for example, be a text message transmitted over SMS to the calling device. The selectable elements include links to destination endpoints which implement the menu options associated with the node at which the calling device was when it disconnected from the call. For example, the selectable elements may be links to telephone extensions, web address, or the like.

At 910, an indication of a selection of a selectable element at the calling device is received. The selection of the selectable element represents a request to connect the calling device to the destination endpoint associated with that selectable element.

At 912, the calling device is connected to a destination endpoint associated with the menu option which is associated with the selectable element selected at the calling device. Connecting the calling device to the destination endpoint can include the messaging system initiating a connection between the calling device and the telephony system to cause the telephony system to establish a new call between the calling device and the destination endpoint.

In some implementations, the technique 900 can include determining whether an amount of time which has elapsed between when the message is transmitted to the calling device and when the indication of the selection of the selectable element at the calling device is received exceeds a threshold. For example, where such a threshold has been exceeded, a session associated with the initial call between the calling device and the destination may be determined to have ended. In such a case, the calling device, based on a selection of a selectable element within the message, may be connected with an agent associated with the destination other than at the one or more IVR menu options or destination endpoint which may be represented by the selectable elements within the message.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
    determining a stage of an interactive voice response service at which a calling device disconnected from a call by processing a record of a call path traversed through the interactive voice response service by the calling device during the call to determine a node of the call path at which the calling device disconnected from the call;
    transmitting a message including a selectable element associated with the stage of the interactive voice response service to the calling device; and
    connecting the calling device to a destination endpoint associated with the stage of the interactive voice response service based on a selection of the selectable element at the calling device.

2. The method of claim 1, wherein the stage of the interactive voice response service corresponds to a menu option presented to the calling device by the interactive voice response service during the call.

3. The method of claim 1, wherein the stage of the interactive voice response service corresponds to an intended destination reached by the calling device navigating through one or more menu options presented to the calling device by the interactive voice response service during the call.

4. The method of claim 1, comprising:
    detecting the disconnection of the calling device from the call.

5. The method of claim 1, wherein the selectable element is one of multiple selectable elements included in the message, wherein each of the multiple selectable elements corresponds to a different stage of the interactive voice response service.

6. The method of claim 1, wherein the destination endpoint corresponds to a telephone extension, and wherein connecting the calling device to the destination endpoint comprises:
    establishing a new call between the calling device and the telephone extension.

7. The method of claim 1, wherein the destination endpoint corresponds to a web service, and wherein connecting the calling device to the destination endpoint comprises:
    establishing a connection between the calling device and a server implementing the web service.

8. The method of claim 1, wherein the selectable element includes a link to the destination endpoint.

9. The method of claim 1, wherein the message is a text message.

10. A non-transitory computer readable medium storing instructions operable to cause one or more processors to perform operations comprising:
    determining a stage of an interactive voice response service at which a calling device disconnected from a call by obtaining a record of a call path traversed through the interactive voice response service by the calling device during the call, wherein the stage of the interactive voice response service corresponds to a node of the call path;
    transmitting a message including a selectable element associated with the stage of the interactive voice response service to the calling device; and
    connecting the calling device to a destination endpoint associated with the stage of the interactive voice response service based on a selection of the selectable element at the calling device.

11. The non-transitory computer readable medium of claim 10, wherein the selectable element is one of multiple selectable elements included in the message, wherein a first selectable element of the multiple selectable elements corresponds to a menu option of the interactive voice response service and a second selectable element of the multiple selectable elements corresponds to an intended destination of the interactive voice response service.

12. The non-transitory computer readable medium of claim 10, wherein the calling device is connected to the destination endpoint over a telephony service or a web service.

13. An apparatus, comprising:
    a memory; and
    a processor configured to execute instructions stored in the memory to:
        determine a stage of an interactive voice response service at which a calling device disconnected from a call by using a record of a call path traversed by the calling device through the interactive voice response service during the call, wherein the record of the call path indicates prior selections of menu options of the interactive voice response service at the calling device before the calling device disconnected from the call;
        transmit a message including a selectable element associated with the stage of the interactive voice response service to the calling device; and
        connect the calling device to a destination endpoint associated with the stage of the interactive voice response service based on a selection of the selectable element at the calling device.

14. The apparatus of claim 13, wherein the processor is configured to execute the instructions to:
 detect the disconnection based on one of a determination that a session initiation protocol transaction with the calling device has ended, a session close indication from the calling device, or a session timeout indication from the calling device,
 wherein the stage of the interactive voice response service is determined in response to the detection.

15. The apparatus of claim 13, wherein the processor is configured to execute the instructions stored in the memory to:
 authenticate the calling device before connecting the calling device with the destination endpoint.

16. The apparatus of claim 13, wherein the processor is configured to execute the instructions stored in the memory to:
 generate the message based on an identification of the destination endpoint.

17. The apparatus of claim 13, wherein the selectable element is a first selectable element and the stage is a first stage, and wherein the message includes a second selectable element associated with a second stage of the interactive voice response service.

* * * * *